(No Model.)
S. ARNOLD.
ROLLER STUD.
No. 410,569. Patented Sept. 10, 1889.
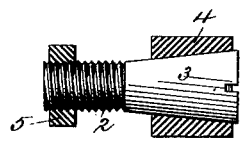
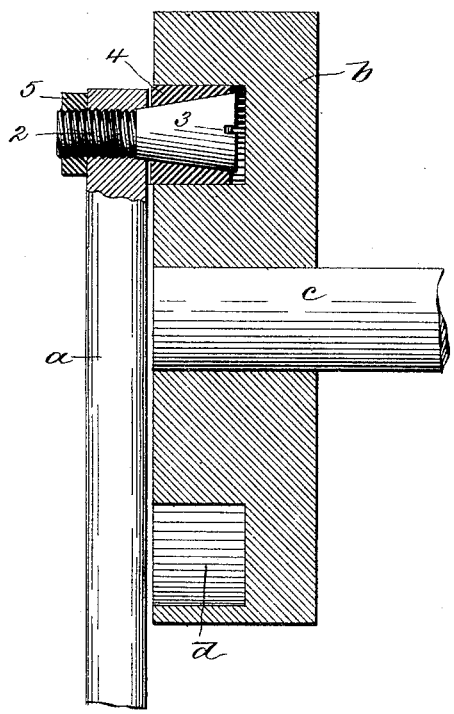

UNITED STATES PATENT OFFICE.

SATTERLEE ARNOLD, OF MORRISTOWN, NEW JERSEY.

ROLLER-STUD.

SPECIFICATION forming part of Letters Patent No. 410,569, dated September 10, 1889.

Application filed May 27, 1889. Serial No. 312,253. (No model.)

*To all whom it may concern:*

Be it known that I, SATTERLEE ARNOLD, a citizen of the United States, residing at Morristown, in the county of Morris and State of New Jersey, have invented certain new and useful Improvements in Roller-Studs, of which the following is a specification, reference being had therein to the accompanying drawings.

In the use of roller-studs in connection with grooved cams considerable difficulty has sometimes been experienced owing to the occasional failure of the rollers to turn on their studs, so that the rollers wear flat in places, and thus fail to serve their intended purpose in preventing friction.

My invention has for its object to obviate this difficulty by providing a construction which will prevent the rollers from sticking on the bearing parts of the studs, and this object I accomplish by forming the bearing portions of the studs tapering or conical and correspondingly tapering the interiors of the rollers to fit on the studs. When the parts are thus constructed, the pressure on the periphery of a roller working in a cam-groove tends to force the said roller down the inclined bearing of the stud or away from the larger part of said bearing, thereby keeping the roller loose on its bearing and preventing it from sticking, as it sometimes does on a straight or cylindrical bearing. This construction also permits the parts to be adjusted to take up the wear of the roller-bearing, as will be obvious.

In the drawings, Figure 1 is a sectional elevation of my improved roller-stud, and Fig. 2 a sectional elevation illustrating the use thereof in connection with a grooved cam.

2 denotes the screw-threaded shank of the stud; 3, the conical or tapered bearing; 4, the roller fitted to said bearing, and 5 a set-nut on the threaded shank 2.

In Fig. 2, $a$ denotes a rod, arm, or lever tapped for the reception of the threaded shank of the stud; $b$, a cam-disk; $c$, a shaft to which said disk is secured, and $d$ the cam-groove in which the roller of the stud works. As the disk $b$ rotates to vibrate or reciprocate the rod, arm, or lever $a$, the pressure against the periphery of the roller 4 by the walls of the cam-groove will tend to force said roller slightly away from the larger end of the tapered bearing, and thus keep said roller sufficiently loose at all times to enable it to turn freely and easily, and the said roller is thus prevented from wearing flat at any portion of its periphery by reason of its failure to turn while the cam is rotating. If the roller-bearing becomes too loose by wear, it is only necessary to loosen the set-nut 5 and screw the stud into its tapped hole in the part $a$ a little, and then again tighten said set-nut.

I am aware that conical bearings for convenience in taking up wear are old, and do not, therefore, wish to be understood as claiming this feature broadly; but What I do claim, and desire to secure by Letters Patent, is—

1. A roller-stud consisting of a shank having a conical or tapered bearing portion, combined with a roller having a tapered interior fitting said bearing portion.

2. The combination, with a roller-stud consisting of a shank having a conical or tapered bearing portion and a roller having a tapered interior fitting said bearing portion, of a part, as $a$, to which said stud is attached, a grooved cam in which said roller works, and a shaft by which said cam is carried.

3. The combination, with a roller-stud consisting of a screw-threaded shank having a conical or tapered bearing portion and a roller having a tapered interior fitting said bearing portion, of a part, as $a$, into which said shank is tapped, a set-nut on said shank, a grooved cam in which said roller works, and a shaft by which said roller is carried.

In testimony whereof I affix my signature in presence of two witnesses.

SATTERLEE ARNOLD.

Witnesses:
C. DIPPLE,
HENRY E. HUTCHINSON.